(12) United States Patent
Ho et al.

(10) Patent No.: US 6,541,931 B2
(45) Date of Patent: Apr. 1, 2003

(54) DUAL STAGE POSITIONING SYSTEM USING A SHARED VOLTAGE SOURCE

(75) Inventors: Hai Thanh Ho, Westminster, CO (US); Margot A. LaPanse, Superior, CO (US); Charles Leon McHenry, Loveland, CO (US); Jianbo He, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/855,354

(22) Filed: May 15, 2001

(65) Prior Publication Data

US 2002/0057068 A1 May 16, 2002

Related U.S. Application Data

(60) Provisional application No. 60/247,497, filed on Nov. 10, 2000.

(51) Int. Cl.[7] .............................................. G05B 11/01
(52) U.S. Cl. ............... 318/560; 318/568.17; 360/78.05; 360/264.7; 360/266.4; 360/294.5; 360/294.6
(58) Field of Search .......................... 318/560, 568.17; 360/78.05, 264.07, 266.2, 266.4, 294.4, 294.5

(56) References Cited

U.S. PATENT DOCUMENTS

| | | | |
|---|---|---|---|
| 5,223,992 A | * | 6/1993 | Mitsuhashi .................. 360/75 |
| 5,291,110 A | | 3/1994 | Andrews, Jr. et al. |
| 5,465,034 A | | 11/1995 | Andrews, Jr. et al. |
| 5,657,179 A | | 8/1997 | McKenzie |
| 5,696,647 A | | 12/1997 | Phan et al. |
| 5,726,825 A | | 3/1998 | Phan et al. |
| 5,751,513 A | | 5/1998 | Phan et al. |
| 5,760,992 A | | 6/1998 | Phan et al. |
| 5,901,009 A | | 5/1999 | Sri-Jayantha et al. |
| 6,219,193 B1 | * | 4/2001 | Janz ............................ 360/55 |
| 6,246,152 B1 | * | 6/2001 | Fontanella et al. .......... 310/317 |
| 6,298,545 B1 | * | 10/2001 | Mohajerani et al. ...... 29/603.03 |

OTHER PUBLICATIONS

HaiT. Ho, "10 Gbpsi Servo TMR TFP," 30K TPI Technical Report, (Apr. 26, 1999).

* cited by examiner

Primary Examiner—Robert E. Nappi
Assistant Examiner—Rina I. Duda
(74) Attorney, Agent, or Firm—Merchant & Gould P.C.

(57) ABSTRACT

A system for positioning a read/write head having a voice coil suitable for coarse control and a piezoelectric transducer (PZT) suitable for fine control. A voice coil control signal and a PZT control signal are generated from a position-indicative signal, both receiving power via a shared supply having a nominal rectified voltage V1. In a preferred method, control signals are both applied to the voice coil and PZT when amplified so that each has a saturation voltage smaller than $|V1|$.

30 Claims, 7 Drawing Sheets

DUAL STAGE POSITIONING SYSTEM USING A SHARED VOLTAGE SOURCE

RELATED APPLICATION

This application claims priority of United States provisional application Ser. No. 60/247,497 filed Nov. 10, 2000.

This application also relates to United States utility patent application Ser. No. 09/641,400 filed Aug. 17, 2000.

FIELD OF THE INVENTION

The present invention relates to writing information to and retrieving information from data storage devices, and more specifically to positioning a read/write transducer head using a microactuator.

BACKGROUND OF THE INVENTION

Data handling devices are used to store the vast amount of electronic information generated each day. Disc drives are the most common data storage devices in use today. Hard disc drives are typically constructed with one or more data recording media discs attached to a spindle, a spindle motor that rotates the spindle and the attached discs at a constant high speed, and an actuator assembly adjacent to the discs. The actuator assembly conventionally includes a plurality of actuator arms that extend over the discs, each with one or more flexures extending from the end of each actuator arm, and with a transducer head (also referred to as a "head," "read/write head," or "slider") mounted at the distal end of each flexure. A servo positioner (including a voice coil motor) rotates the actuator assembly about a bearing shaft assembly, positioned adjacent to the discs, such that the transducer heads radially traverse the disc surface (i.e. move back and forth the between the inner and outer diameters of the disc).

Discs are radially divided in concentric circles known as "servo tracks" or "tracks," to facilitate information storage and retrieval. The tracks are assigned a track number enabling the servo positioner to locate a specific track. The servo positioner, upon receiving a control command, uses the track number (among other information) and aligns the transducer head over the desired track. Information can be stored (i.e., a write operation) or retrieved (i.e., a read operation) from the disc once the transducer head is aligned in the correct position. The process of moving the transducer head between different tracks is called "seeking," whereas holding the transducer head over a single track while information is stored or retrieved is called "following."

The number of tracks located within a specific area of the disc is called the "track density." The greater the number of tracks per area, the greater the track density. Disc manufacturers attempt to increase track density in order to place more information on a constant size disc. Track density may be increased by either decreasing the track width or by decreasing the spacing between adjacent tracks.

An increase in track density necessitates an increase in the positioning accuracy of the read/write transducer in order to prevent data from being read from or written to the wrong track. To insure that the information is being read from and written to the correct track, manufacturers attempt to fly the read/write transducer directly over the center of the desired track when a read/write operation is occurring.

Manufacturers have developed dual-stage actuators to increase the positioning accuracy of the read/write head. A dual-stage actuator includes the primary stage actuator controlled with a voice coil motor ("VCM") (as discussed above) and a microactuator controlled with a driving circuit. The microactuator usually consists of one or more piezoelectric elements attached, coupled, bonded or integrated with the primary actuator. A piezoelectric element usually contains a layer of crystals. Applying a voltage potential across a portion of the crystal changes the dimensions of each crystal, and therefore, the piezoelectric element. Modern piezoelectric elements, or devices, are usually constructed of ceramic composites that exhibit piezoelectric characteristics. The ceramic composites are easily formed as thin layers on silicon substrates and integrated into electrical devices, such as microactuators.

Several configurations for integrating the piezoelectric element into a dual-stage actuator have been implemented (such as constructing a planar piezo-actuator/suspension system, attaching the piezoelectric element between the head gimble assembly and the flexure, and bonding a piezoelectric element between the actuator arm and flexure among others). In a typical microactuator, the piezoelectric element is formed into a thin strip and attached between the actuator arm and the flexure. A voltage is applied to change the length of the piezoelectric element. Changing the length of the piezoelectric element causes the read/write head, which is attached to the distal end of the flexure to be radially displaced relative to the surface of the disc.

In other words, fine positioning of the read/write head over a track on the disc surface can be accomplished using the microactuator. The microactuator driver circuit produces a voltage, which is applied to the piezoelectric element, necessary to align the read/write head over a track. The piezoelectric element, in response to the applied voltage, constricts or elongates, thereby displacing the read/write head relative to the surface of the disc. The read/write head, therefore, is accurately positioned over the center of a desired track using the microactuator.

Currently, a microactuator requires specially designed high-power circuits to drive the piezoelectric element. Current driving circuits generally utilize a high-power operational amplifier and require an additional high-voltage source not otherwise used in the data handling system. The additional components and the processes needed to incorporate the components into the system have thus far made microactuators unfeasible for most data handling applications and most disc drive applications.

Manufacturers have attempted to overcome these limitations by integrating the microactuator's control electronics directly into the servo control chip. Integration of complex control electronics, however, adds expense and an increased risk of signal interference to the control chip. A more effective solution to these problems is therefore needed.

SUMMARY OF THE INVENTION

The present invention is a system for positioning a read/write head having a voice coil suitable for coarse control and a piezoelectric transducer (PZT) suitable for fine control. A voice coil control signal and a PZT control signal are generated from a position-indicative signal, both receiving power via a shared supply having a nominal rectified voltage V1. In a preferred method of the present invention, unlike any prior art systems, both control signals are applied when amplified so that each has a saturation voltage smaller than $|V1|$.

Another embodiment of the present invention is a data handling apparatus having a general purpose operational amplifier configured to drive the microactuator's piezoelectric element(s). The driver's components are low-cost, easily implemented, and help to avoid electromagnetic interference on the servo control chip.

These and various other features as well as advantages, which characterize the present invention, will be apparent from a reading of the following detailed description and a review of the associated drawings.

DETAILED DESCRIPTION

The invention is described in detail below with reference to the figures. When referring to the figures, like structures and elements shown throughout are indicated with like reference numerals.

Numerous aspects of servo positioning that are not a part of the present invention (or are well known in the art) are omitted for brevity, avoiding needless distractions from the essence of the present invention. These include, for example, basic operation of an operational amplifier and a conventional two-stage servo control system. Although the examples below show more than enough detail to allow those skilled in the art to practice the present invention, subject matter regarded as the invention is broader than any single example below. The scope of the present invention is distinctly defined, however, in the claims at the end of this document.

Figure 1:
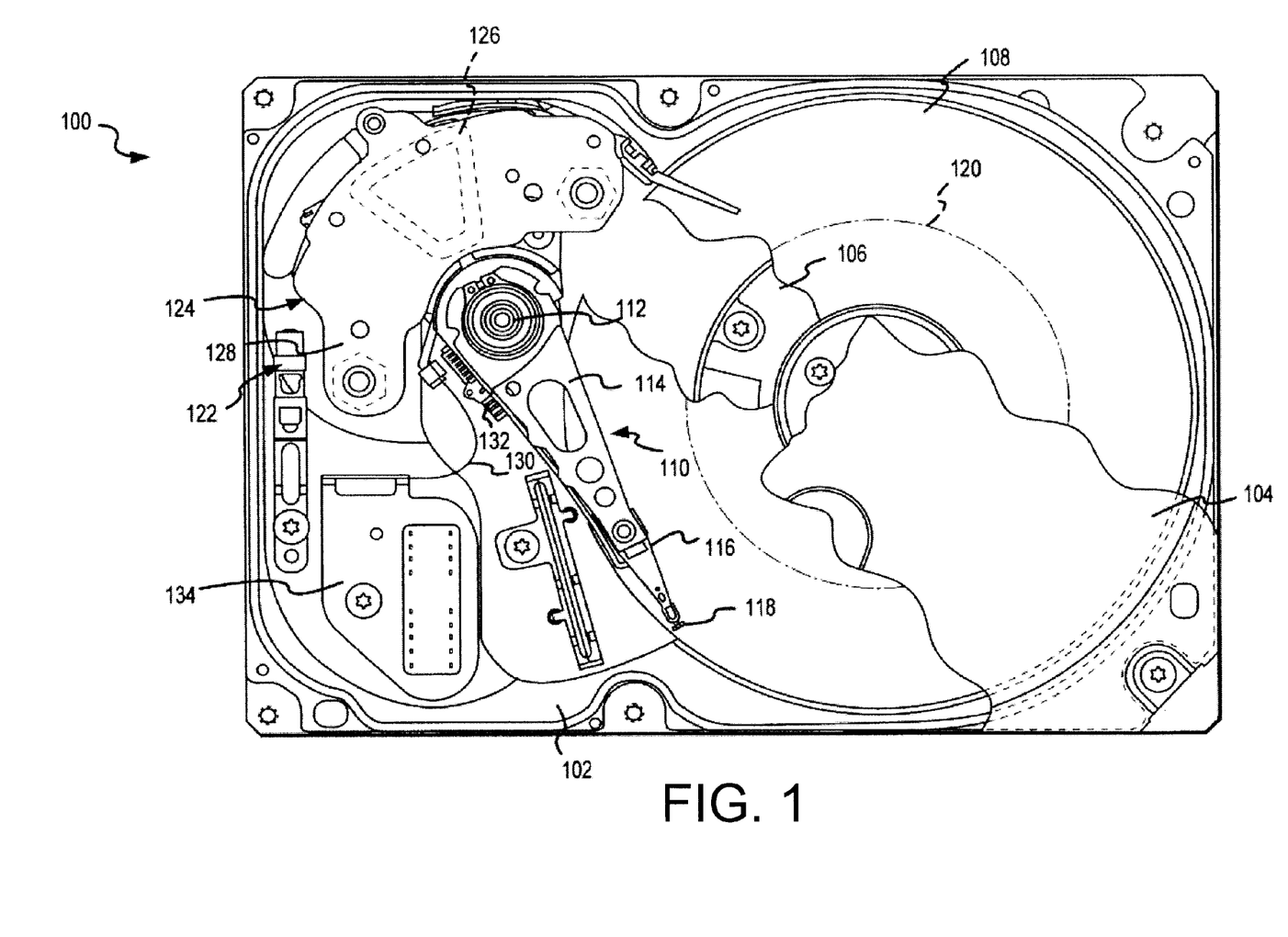
FIG. 1 is a plan view of a disc drive constructed in accordance with one embodiment of the present invention.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more data storage discs 108 at a constant high speed. Information is written to and read from tracks 120 on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a transducer head 118 which includes an air-bearing slider enabling the transducer head 118 to fly in close proximity above the corresponding surface of the associated disc 108.

During a seek operation, the overall track 120 position of the transducer heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112 and the transducer heads 118 are caused to move across the surfaces of the discs 108 between the inner diameter 204 and outer diameter 203 of the disc(s) 108. Fine control of the position of the head 118 is made with a microactuator 200 that operates between the flexure 116 and the actuator arm 114. The microactuator 200 includes a piezoelectric elements 201,202 attached to the primary actuator 110.

Figure 2:
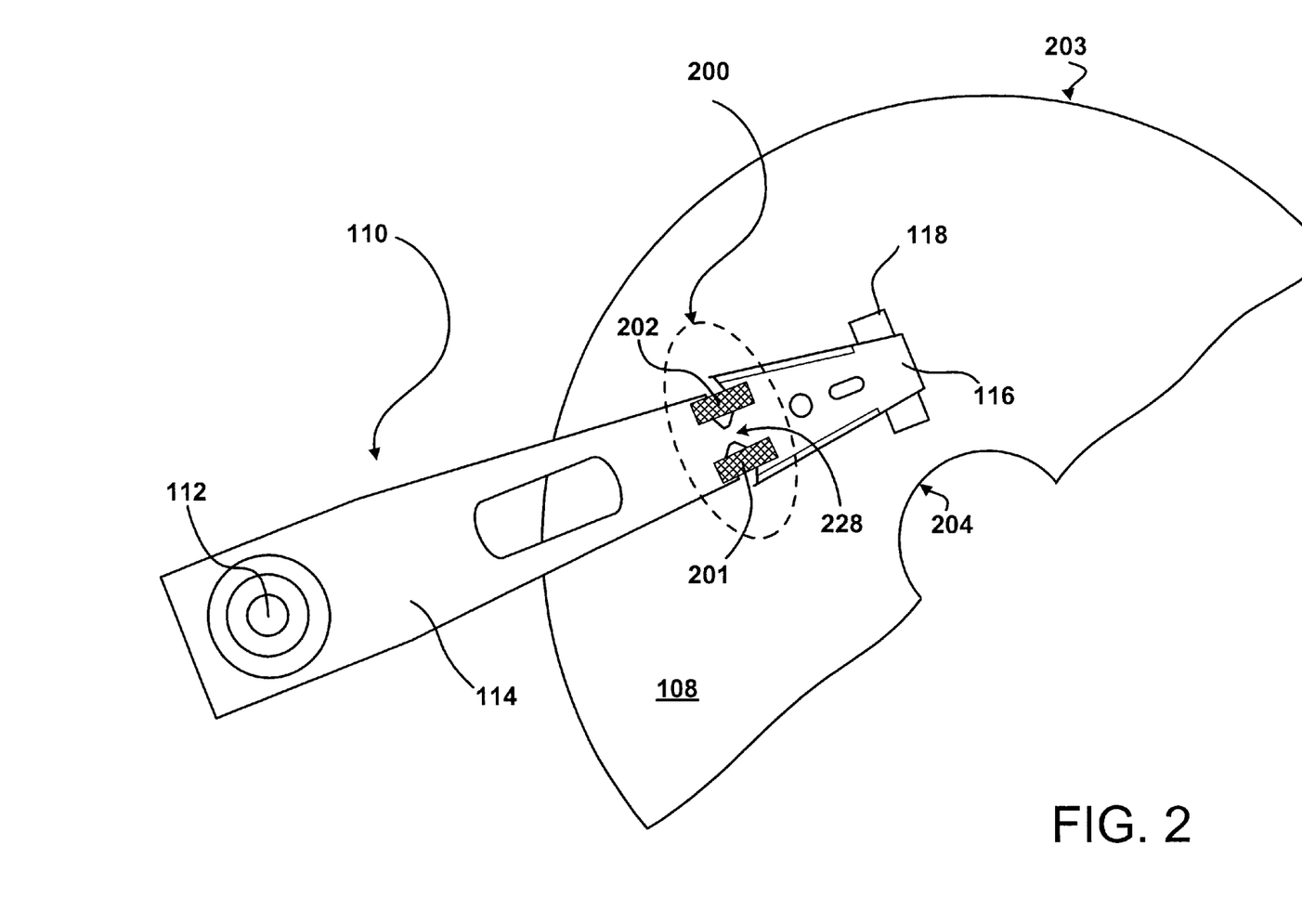
FIG. 2 is an enlarged, simplified view of a dual-stage actuator as utilized in the present invention shown in FIG. 1.

FIG. 2 is an enlarged, simplified schematic view of a dual-stage actuator, comprised of the primary actuator 110 and the microactuator 200. The piezoelectric elements 201, 202 of the microactuator 200 are preferably bonded to the primary actuator 110 using an adhesive. Electrical leads (not shown) are connected to the piezoelectric elements 201,202 and terminate at a driving circuit 300 shown in block diagram form in FIG. 3. The piezoelectric elements 201,202, driving circuit 300, and corresponding electrical leads are all components of the microactuator 200. The piezoelectric elements 201,202 elongate or contract with voltage applied by the driver circuit 300. In the preferred embodiment shown, the piezoelectric elements 201,202 are fastened to the actuator arm 114 and to the flexure 116 in such a manner as to permit the position of the head 118 on the primary actuator 110 to move radially relative to the surface of the data storage disc 108 when the relative lengths of the piezoelectric elements 201,202 change.

Application of a smaller-than-nominal or negative voltage, for example, causes the outer piezoelectric elements 202 to "shrink" from a nominal length, which in turn cause he read/write head 118 to move slightly towards the outer diameter 203 of the data storage disc 108. Application of a larger-than-nominal positive voltage causes the inner piezoelectric element 201 to "elongate" from its nominal length, causing the read/write head 118 to move slightly further towards the outer diameter 203 of the data storage disc 108. Preferably, piezoelectric elements (such as 201 and 202) on opposite sides of a pivot (such as 228) share a common DC bias and opposing AC components, so that they cooperate for faster and farther microactuator position changes.

Figure 3:
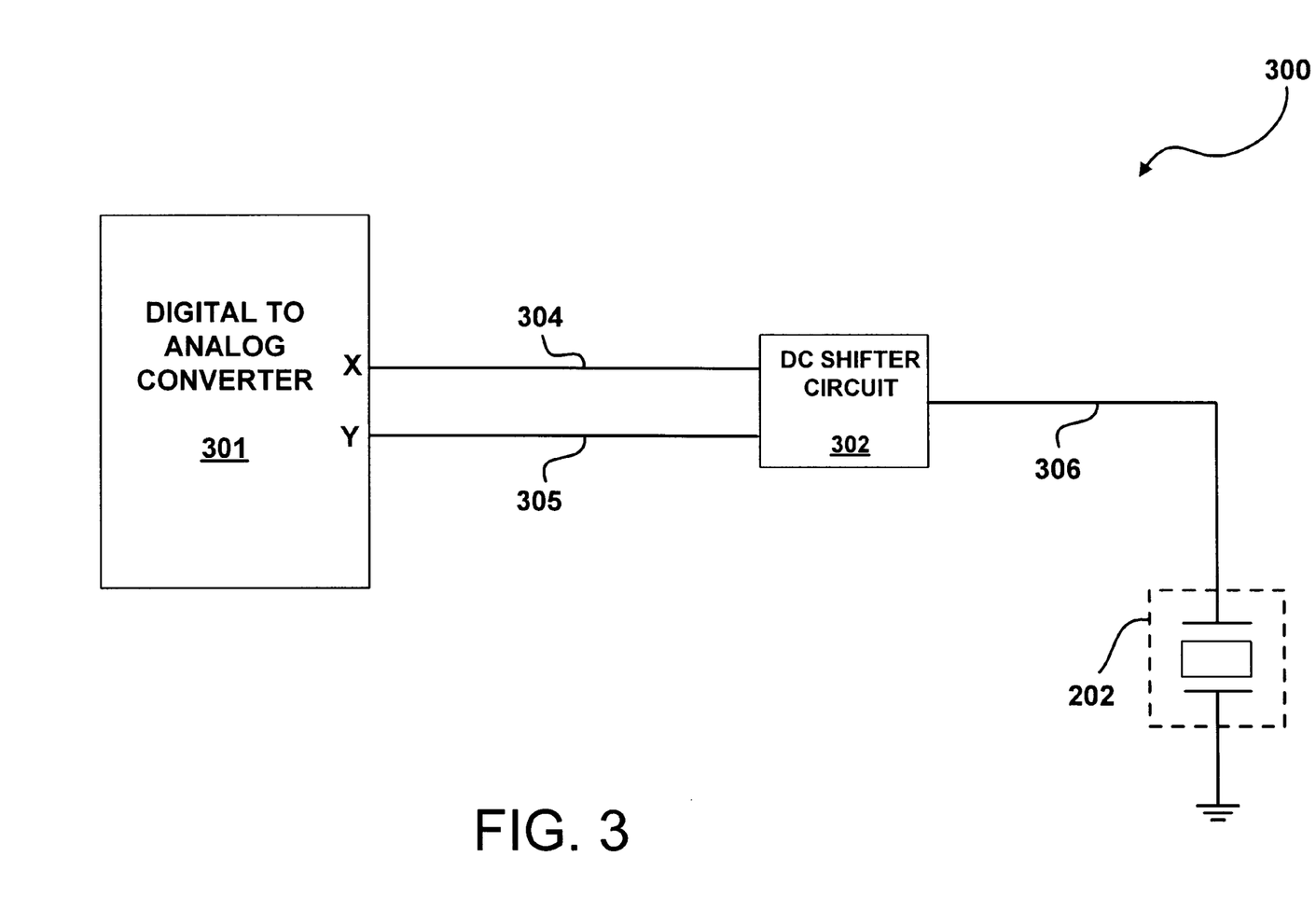
FIG. 3 is a block diagram of a microactuator driver circuit in accordance with the present invention.

FIG. 3 is a simplified block diagram of the microactuator driver circuit 300. A digital-to-analog converter ("DAC") circuit 301 is electrically connected to a DC shifter circuit 302. The DC shifter circuit 302 contains a low power operational amplifier. The op-amp is powered by pre-existing power sources that are available to the disc drive 100 (such as a +12 volt or a −5 volt power bus among others). The op-amp may optionally be a general purpose component, i.e. one that is not specially designed for a microactuator driver circuit but is available "off the shelf." A "low power" operational amplifier is defined as an operational amplifier that has a maximum output current of about 30 milliamps and a maximum output voltage magnitude that is less than or equal to the maximum voltage magnitude of the supply circuit that supplies power to the op-amp. One such component is the Semiconductor Components Industries' Model MC34074A op-amp.

The DC shifter circuit 302 is electrically connected to the piezoelectric elements 201,202. In the typical embodiment, a position control signal 304, comprised of both AC (time-varying, zero average) and DC (time invariant) components, is transmitted from the X terminal of the DAC 301. Likewise, a DC reference signal 305 is transmitted from the Y terminal of the DAC 301. The DC shifter circuit 302 combines the position control signal 304 with the DC reference signal 305. The modified position control signal 306, containing both AC and DC components, is transmitted from the DC shifter circuit 302 to the piezoelectric elements 201,202. The AC component of the modified position control signal 306 represents the position control signal of the microactuator 200, whereas the DC component represents a DC bias value. The DC bias value is used to "center" the piezoelectric elements 201,202 such that equal amounts of "negative" and "positive" displacements are obtainable. In other words, the amount of displacement of the head 118 obtained when a maximum negative position control signal is applied to the piezoelectric elements 201,202 equals the amount of displacement obtained when a maximum positive position control signal is applied to the outer piezoelectric element 202.

As shown in the drawing, maximum displacement will occur when one PZT is fully elongated and the other PZT is fully contracted. In other words, the amount of displacement of the head 118 obtained when a maximum negative position control signal is applied to the piezoelectric element 201 and a maximum positive position control signal is applied to the piezoelectric element 202 equals the amount of displacement obtained when a maximum position control signal is applied to the piezoelectric element 201 and a minimum position control signal is applied to the piezoelectric element 202.

It should be noted that FIG. 3 illustrates a preferred embodiment of the present invention. Other embodiments within the scope of this invention are possible. The DAC 301, for example, does not have to be a part of the microactuator circuit 300, but can be part of a data handling system's servo control circuitry. Furthermore, the DC shifter circuit 302 can be implemented using a variety of electrical components or circuits (such as resistors, capacitor, diodes, and filter circuits among others).

Figure 4:
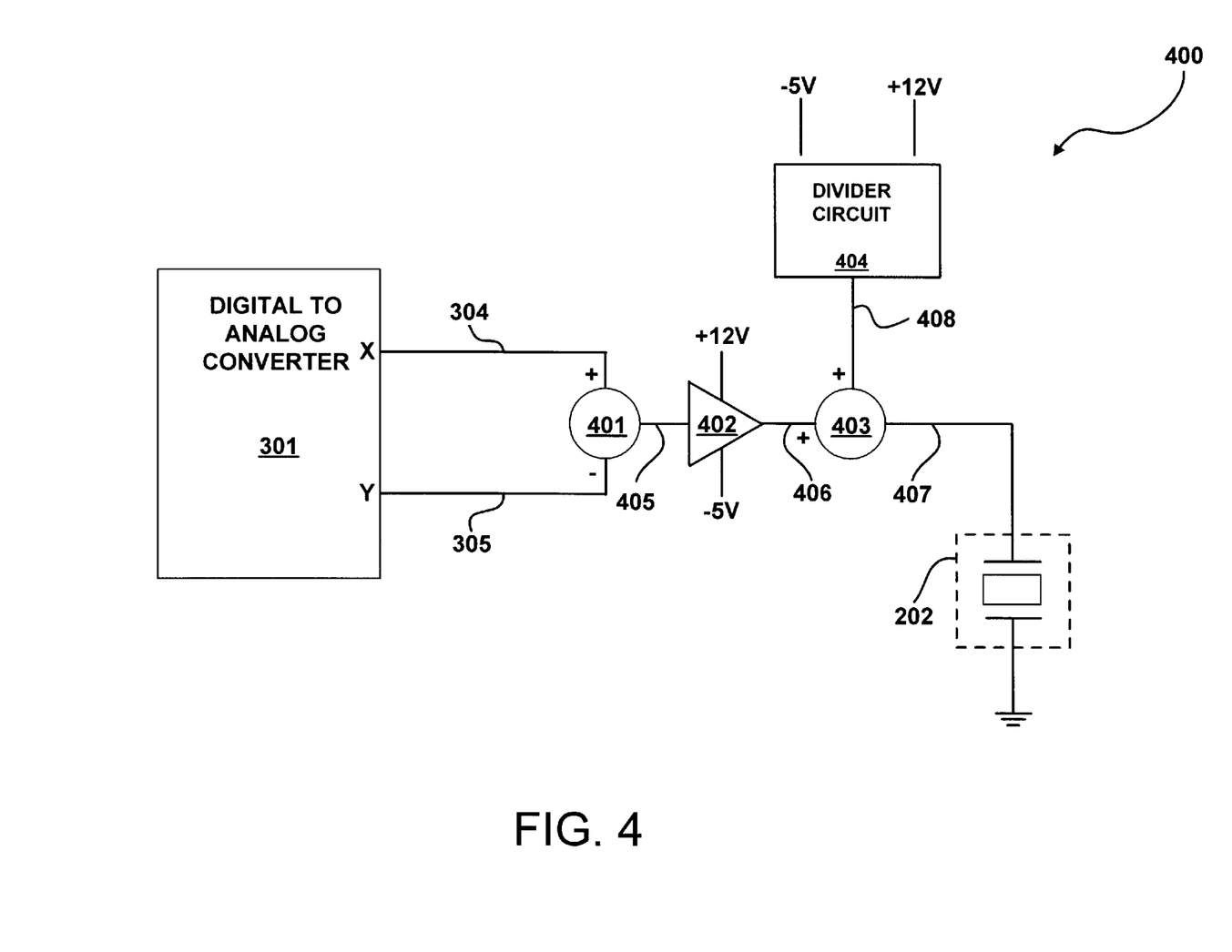
FIG. 4 is a simplified schematic diagram of a preferred embodiment of the microactuator driver circuit of the present invention.

FIG. 4 is a simplified schematic diagram of one preferred embodiment of the microactuator driver circuit 400 of the present invention. In this embodiment, the DAC circuit 301 is electrically connected to a summing circuit 401 via X terminal and Y terminal outputs. The X terminal output transmits a first position control signal 304 containing both AC and DC components to the summing circuit 401. The Y terminal output transmits a DC reference signal 305 to the summing circuit 401. The summing circuit 401 subtracts the DC reference signal 305 from the first position control signal 304 to obtain a second position control signal 405. The summing circuit 401 transmits the second position control signal 405 to an operational amplifier ("op-amp") 402. The op-amp 402 amplifies the second position control signal 405 to obtain an amplified second position control signal 406. The amplified second position control signal 406 is transmitted to a second summing circuit 403. The second summing circuit 403 combines the amplified second position control signal 406 with a DC bias signal 408 that is transmitted from a divider circuit 404 to the second summing circuit 403 to obtain a third position control signal 407. The third position control signal 407 is sent to the outer piezoelectric element 202, which finely adjusts the position of the read/write head 118. An inverted position control signal 407 can optionally be provided to inner piezoelectric element 201, techniques for which are known in the art. In the preferred embodiment, the X terminal output transmits a first position control signal 304 comprised of both AC and DC components to the summing circuit 401. The Y terminal output transmits a DC reference signal 305 to the summing circuit 401. The summing circuit 401 subtracts the DC reference signal 305 from the first position control signal 304 to eliminate the DC component of the first position control signal 304. The output of the summing circuit 401 is called the second position control signal 405 and represents the microactuator 200 position control signal.

The second position control signal 405 is then amplified by the op-amp 402 to obtain an amplified second position control signal 406. The op-amp 402 is powered by pre-existing power sources that are available to the disc drive 100 (such as a +12 volt or a −5 volt power bus among others). The op-amp 402 increases the amplitude of the second position control signal 405 such that the second position control signal 405 is of a sufficient size to drive the outer piezoelectric element 202. In a preferred embodiment, the op-amp 402 is a low-power, general purpose component (such as Semiconductor Components Industries' Model MC34074A op-amp among others). In other words, the op-amp 402 need not be specially designed or fabricated for use in the microactuator driving circuit 400. Additionally, the op-amp 402 utilizes existing −5 volt and +12 volt power sources available to the disc drive 100 and does not require an external, high-voltage power supply. Furthermore, a high or low pass filter (not shown) can be integrated with the op-amp 402 in order to eliminate unwanted resonance caused by the suspension of the dual-stage actuator.

The op-amp 402 transmits the amplified second position control signal 406 to the second summing circuit 403. The second summing circuit 403 combines a DC bias signal 408 from the divider circuit 404 with the amplified second position signal 406 to obtain a third position control signal 407. The DC bias signal 408 is used to "zero" the piezoelectric elements 201,202 such that substantially equal "negative" and "positive" displacements are obtainable. In this case, the amount of displacement obtained when a maximum negative position control signal is applied to the microactuator 200 equals the amount of displacement obtained when a maximum positive position control signal is applied to the microactuator. The third position control signal 407, containing both AC and DC components, is sent to the piezoelectric elements 201,202. The AC component of the third position control signal 407 represents the position control signal of the microactuator 200, whereas the DC component of the third position control signal 407 represents the DC bias.

In a preferred embodiment, the DC bias signal 408 has a value between −5 volts and +12 volts. The available voltages present within the disc drive 100 system establish the voltage range of the divider circuit 404. The −5 volts and +12 volts signals are obtained from power busses already available to the disc drive 100. In other words, an additional, external power supply is not needed for the microactuator driver circuit 400 of the present invention. It should be noted that a different voltage range, the limits of which are set by pre-existing power sources available to the disc drive 100, may alternatively be used.

It should be noted that FIG. 4 represents a preferred embodiment of the present invention. Other embodiments within the scope of this invention are possible. The DAC 301, for example, does not have to be a part of the microactuator circuit 400, but can be part of the disc drive's 100 control circuitry. Furthermore, the summing circuits 401, 403 and divider circuit 404 among others can be implemented using a variety of electrical components or circuits (such as resistors, capacitor, diodes, and filter circuits among others).

Figure 5:
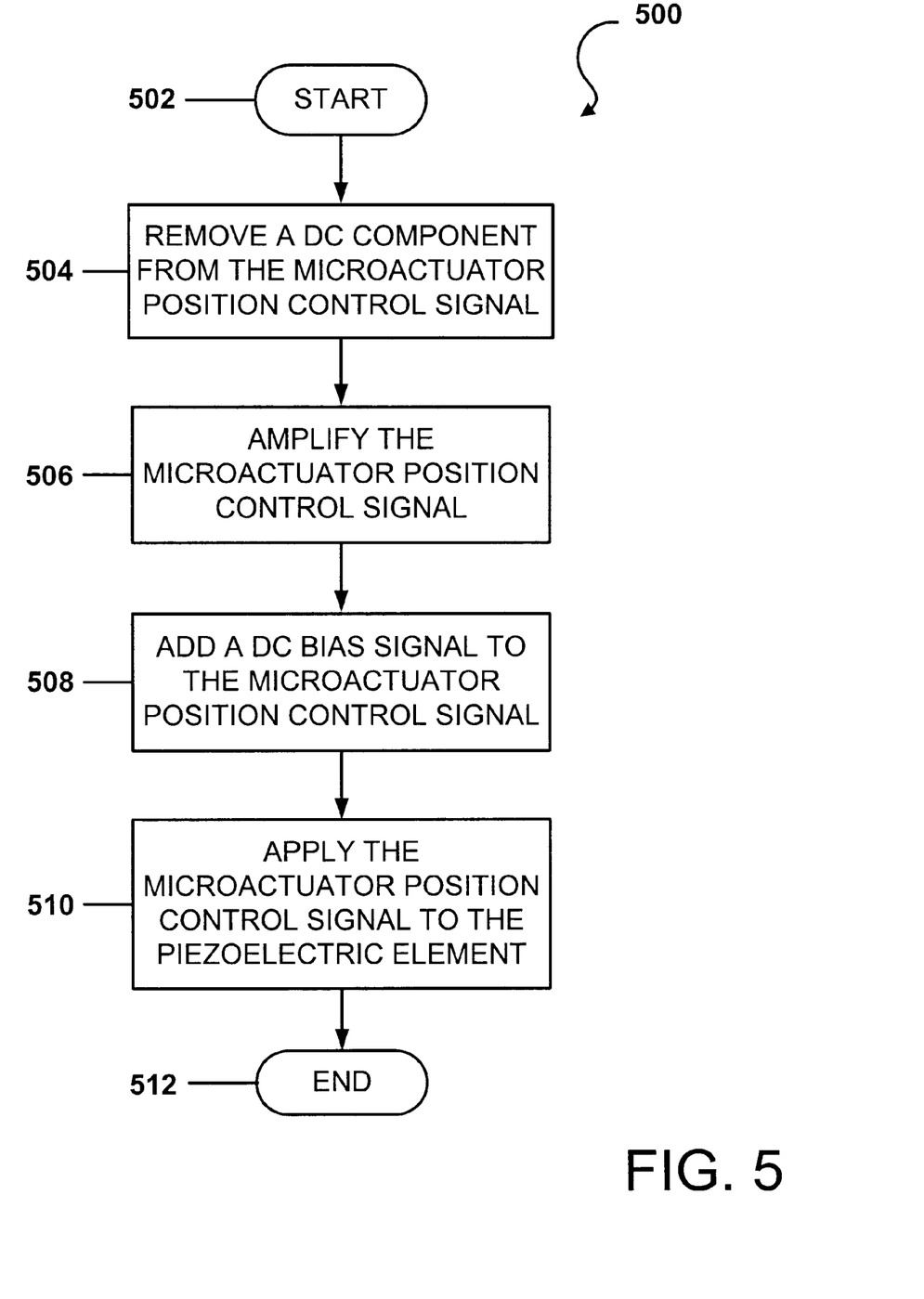
FIG. 5 is a flow diagram of the head/positioning operational process of a preferred embodiment of the present invention.

FIG. 5 is a flow diagram of a preferred embodiment of head positioning operational process 500 of the present invention. Operational process 500 begins with operation 502, which begins head positioning process 500 by issuing a position signal into the DAC 301. Control then transfers to operation 504. Operation 504 removes a DC component from the microactuator position control signal 304 produced by the DAC 301. In particular, the first position control signal 304 is produced at the X terminal output of the DAC circuit 301. The first position control signal 304 has both AC and DC components. The DC component is removed by summing the position control signal 304 with the DC reference signal 305 in summing circuit 401 to obtain a second position control signal 405. The DC reference signal 305 can be pre-set by the manufacturer or calculated (such as by using the disc drive 100 control electronics among others).

Operation 506 assumes control after the DC component is removed from the position control signal 304 in operation 504. In operation 506, the microactuator position control signal 405 is amplified. In the preferred embodiment, the second position control signal 405 is amplified by operational amplifier 402 to obtain the amplified second position control signal 406. Operational control is then passed to operation 508.

Operation 508 adds a DC bias signal 408 to the microactuator position control signal 406. The DC bias signal 408 is used to zero the piezoelectric elements 201,202 of the microactuator 200. In the preferred embodiment, the second summing circuit 403 combines the DC bias signal 408 from the divider circuit 404 with the amplified second position signal 406 to obtain a third position control signal 407. The DC bias signal 408 preferably has a value between −5 volts and +12 volts. Operational control is then passed to operation 510.

Operation 510 applies the microactuator position control signal 407 to the piezoelectric elements 201,202 of the microactuator 200. The AC component of the third position control signal 407 represents the position control signal of the microactuator 200, whereas the DC component of the third position control signal 407 represents the DC bias 408. The application of the third position control signal 407 to the piezoelectric elements 201,202 causes one of the dimensions of the piezoelectric elements 201,202 to change, which in turn, causes the read/write head 118 to move relative to the surface of the data storage media 108. After the read/write head 118 is positioned at the desired location, operational control is then passed to operation 512, which terminates operational process 500.

Figure 6:
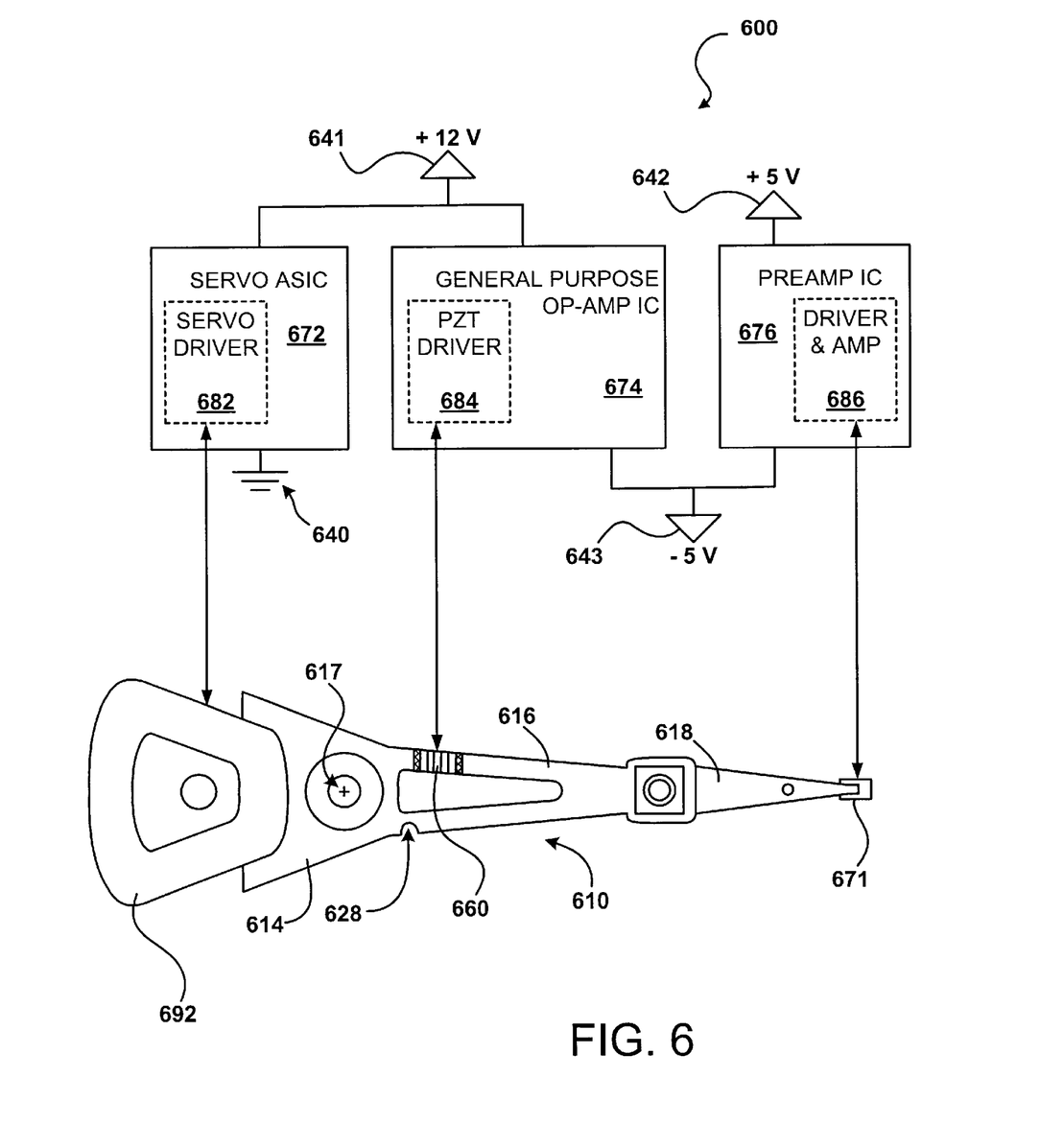
FIG. 6 shows another data handling device configured for implementing the resent invention.

FIG. 6 shows another data handling device 600 configured for implementing the present invention. It includes actuator assembly 610 supporting read/write head 671 to be positioned. For coarse adjustments, a current through coil 692 is controlled so that the body 614 of actuator assembly 610 is rotated about axis 617 so that read/write head 671 moves toward a target position (not shown). Read/write head 671 is supported by load beam 618, which is supported by actuator arm 616 by conventional means. In a portion of the actuator arm 616 that is nearer to the axis 617 than to the head 671, a mechanism for fine adjustment includes a piezoelectric transducer 660 able to pivot the head 671 in a plane about flexible pivot 628.

Operatively coupled to voice coil 692 is servo driver 682, a circuit of the servo ASIC 672 which is conventionally powered with a 12 volt supply 641 and a ground 640. Operatively coupled to read/write head 671 are driver and amplifier circuits 686 which reside on preamp IC 676 which is conventionally powered by a +5 volt supply 642 and a −5 volt supply 643. In a similar but unconventional manner, the PZT 660 is powered (through PZT driver 684 implemented on op-amp IC 674) by a positive supply 641 shared with the servo driver and by a negative supply 643 shared with the preamp IC 676. PZT driver 684 is preferably physically separate from servo ASIC 672, and is preferably implemented in a general purpose op-amp IC.

Figure 7:
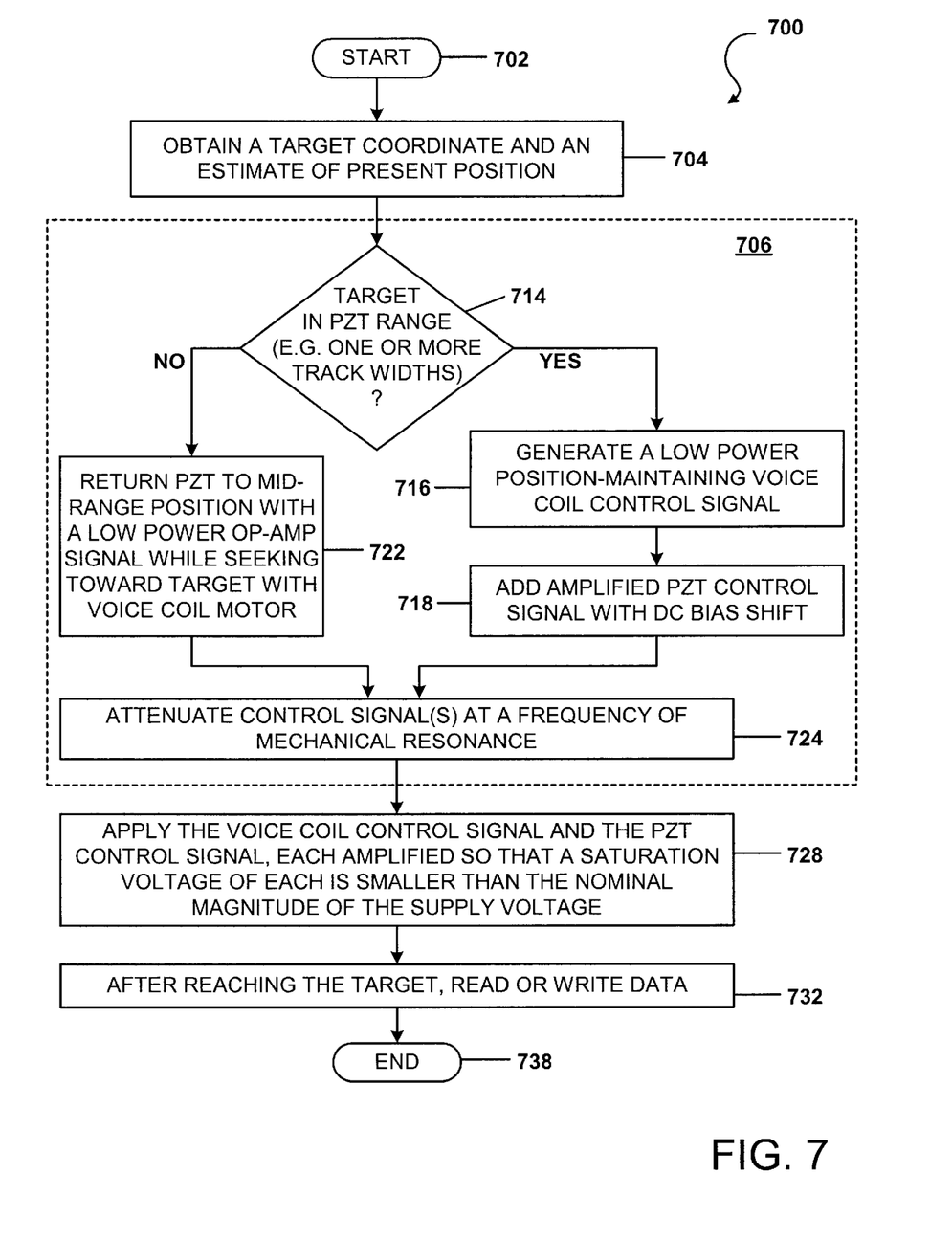
FIG. 7 shows another method of the present invention for positioning the read/write head in the configuration of FIG. 6.

FIG. 7 shows a method 700 of the present invention for positioning the read/write head 671 of FIG. 6, comprising steps 702 through 738. At the start 702, the PZT(s) are preferably biased in a mid-range position. For example, the PZT driver 684 of FIG. 6 may be biased at 3.5 volts, about 8.5 volts from each of its rails. A target position and an estimate of the present position are obtained 704. In a disc drive, for example, the target position is conventionally identified as a track ID, and the position estimate is conventionally provided as a decoded track ID and digitized position error signal (PES). In step 706 voice coil control signal and a PZT control signal are derived from the position estimate and the target. First, this involves determining whether the target is within the range of the PZT 714, methods for which are known in the art. Typically they involve comparing the present digital value of the PZT control signal against a digital range bounded by two saturation values. If the target is not within the range of the (non-saturated) PZT, a conventional VCM seek signal is generated while the low power op-amp signal returns the PZT to a mid-range position 722. Optionally, with a low power opamp, a microactuator can be driven so as to reduce unwanted resonances in the motion of the read/write head. In either case, the current drain on the shared power supply 641 caused by the op-amp's operation has a negligible effect upon VCM performance, even if VCM and microactuator are both driven within two volts of their saturation voltages.

A PZT may span one track width or many track widths. Whether a target is in the microactuator's range depends upon the position of the microactuator within its range. Techniques for controlling a microactuator within its fixed range of motion are known in the art. If the target is within the PZT range 714 in the current method 700, a position-maintaining voice coil signal is generated 716 so as to minimize load on the shared supply 641. Then, an amplified PZT control signal and a DC bias shift are generated and combined 718. Finally, frequencies of mechanical resonance are attenuated from the position-indicative signal or one or both control signals (e.g. resonances of the actuator arm, the flexure, or the PZT).

Once the voice coil and PZT signals are derived, they are applied to their respective mechanical components 728 while amplified so that a saturation voltage of each is smaller than a nominal magnitude of the shared supply voltage 641. After reaching the target position, typically after numerous iterations of steps 706 through 728, data is read from or written to the target 732.

In summary, and in view of the foregoing discussion, it will be understood that one embodiment of the present invention provides an apparatus for positioning a read/write head (such as 118) in a data storage device (such as 100) wherein the read/write head (such as 118) is connected to a flexure (such as 116), which is connected to an actuator arm (such as 114), and wherein a dimensionally variable piezoelectric element (such as 202) is connected to one of the actuator arm (such as 114), the flexure (such as 116), and the read/write head (such as 118) such that a dimensional change in the piezoelectric element (such as 202) causes the read/write head (such as 118) to be radially displaced relative to a data recording media surface (such as 108). The apparatus is comprised of a general purpose operational amplifier (such as 402). The general purpose operational amplifier (such as 402) can be viewed as being powered by a pre-existing positive power source available to the data storage device (such as 100) and by a pre-existing negative power source available to the data storage device (such as 100). The general purpose operational amplifier (such as 402) is electrically connected to a summing circuit (such as 403). A divider circuit (such as 404) is also electrically connected to the summing circuit (such as 403), wherein the summing circuit (such as 403) is electrically connected to the piezoelectric element (such as 202).

Additional, the general purpose operational amplifier (such as 402) can be coupled to a filter circuit, the filter circuit being tuned to eliminate high frequency disturbances present within the actuator assembly (such as 110, 200). Furthermore, the apparatus can be viewed as having a first portion of the piezoelectric element (such as 202) bonded to the actuator arm (such as 114) and having a second portion of the piezoelectric element (such as 202) bonded to the flexure (such as 116). The summing circuit (such as 403) output signal can be viewed as having an ac-component and a DC component and amplitude between −5V and +12V.

Alternatively, the present invention may be viewed as a method (such as operational process 500) of positioning a read/write head (such as 118) in a data storage device (such as 100), wherein the read/write head (such as 118) is connected to a flexure (such as 116), which is connected to an actuator arm (such as 114), and wherein a dimensionally variable piezoelectric element (such as 202) is connected to one of the actuator arm (such as 114), the flexure (such as 116), and the read/write head (such as 118) such that a dimensional change in the piezoelectric element (such as 202) causes the read/write head (such as 118) to be radially displaced relative to a data recording media surface (such as 108). The method (such as operational process 500) can be viewed as comprising the steps of removing a DC component present in a first position control signal (such as 304) to obtain a second position control signal (such as 405) and amplifying the second position control signal (such as 405) with a general purpose operational amplifier (such as 402) to obtain an amplified second position control signal (such as 406), wherein the general purpose operational amplifier (such as 402) is powered by a preexisting power source readily available to the data storage device (such as 100). The method (such as operational process 500) includes summing the amplified second position control signal (such as 406) with a DC bias signal (such as 408) to obtain a third position control signal (such as 407), and applying the third position control signal (such as 407) to the piezoelectric element (such as 202).

Additionally, the DC bias signal (such as 408) in the method's (such as operational process 500) summing step can be viewed as having an amplitude less than or equal to the amplitude of a power source available to the data storage device (such as 100). The DC bias signal (such as 408) in the method's (such as operational process 500) summing step can also be viewed as corresponding to a voltage amplitude that dimensionally changes the piezoelectric element (such as 202) such that the amplified second position control signal (such as 406) can radially displace the read/write head (such as 118) an equal distance, forward or backward, relative to an inner diameter (such as 204) of the data recording media surface (such as 108). Additionally, the voltage of the third position control signal (such as 407) in the method's (such as operational process 500) applying step can be viewed as not exceeding the highest voltage of a power supply used by the data storage device (such as 100). Furthermore, the method's (such as operational process 500) amplifying step can be viewed as further comprising filtering the amplified second position control signal (such as 406) to eliminate a high frequency resonance.

Alternatively, the present invention can be viewed as an actuator assembly for transferring information to and from a data recording media (such as 108) in a data storage device (such as 100) wherein the actuator comprises a data transducer (such as 118) configured to read and write data from and to the data recording media (such as 108), a piezoelectric element (such as 202) configured to move the data transducer (such as 118) in response to an applied electrical signal (such as 306, 407) having a current component and a voltage component, and a low-power, general purpose operational amplifier (such as 402) coupled with the piezoelectric element (such as 202), wherein the low-power, general purpose operational amplifier (such as 402) is powered by a pre-existing positive power source available to the data storage device (such as 100) and by a pre-existing negative power source available to the data storage device (such as 100).

Additionally, the low-power, general purpose operational amplifier (such as 402) of the actuator assembly can be viewed as having a maximum current output of about 30 milliamps. The low-power, general purpose operational amplifier (such as 402) of the actuator assembly can also be viewed as having a maximum output voltage less than or equal to the maximum voltage of the voltage supply used to power the low-power, general purpose op-amp (such as 402). Furthermore, the voltage component of the applied electrical signal (such as 306, 407) can be viewed as containing a DC bias voltage component. The DC bias voltage component can be viewed as corresponding to a voltage that dimensionally changes the piezoelectric element (such as 202) of the actuator assembly such that the piezoelectric element (such as 202) can radially displace the data transducer (such as 118), relative to the data recording media (such as 108), an equal distance toward or away from an inner diameter (such as 204) of the data recording media (such as 108).

Further, the present invention can be viewed as an apparatus having a piezoelectric element (such as 202) for positioning a read/write head (such as 118) in a data storage device (such as 100) comprising a circuit (such as shown by circuit 300 or 400) having a low-power, general purpose operational amplifier (such as 402) for driving the piezoelectric element (such as 202), and a means for powering the low-power, general purpose operational amplifier (such as 402) with a pre-existing power source available to the data storage device (such as 100).

Yet another embodiment of the present invention is a method of positioning a read/write head (such as 671) in a data handling device (such as 600) having a voice coil (such as 692) suitable for coarse control and a piezoelectric transducer (such as 660) suitable for fine control. A target coordinate and a position-indicative signal is received (e.g. by step 704) from the read/write head. A voice coil control signal and a PZT control signal are generated from the position-indicative signal (e.g. by step 706). Power is supplied via a shared supply (such as 641) having a nominal rectified voltage V1 to both the voice coil and the PZT (e.g. by step 712). Each has a control signal respectively applied to the voice coil and to the PZT, and each has a saturation voltage between zero and V1.

Preferably, the PZT is constructed so that a 10 volt change in the PZT control signal can cause the read/write head to traverse several tracks. (In a disc drive, this traversal will be in a substantially radial direction, toward an innermost or outermost track.) In this case, very short seeks (within the PZT range, determined such as by step 714) can be accomplished without substantially changing the voice coil control signal (e.g. by step 716). First, the PZT control signal is amplified and arithmetically combined with a DC bias shift (e.g. by step 718). The amplified, combined signal is then applied to the PZT (e.g. by step 720). For seeks to targets not within the microactuator range (determined such as by step 714), voice coil motor performance is optionally maintained near saturation (i.e. within two volts of a saturation voltage) by keeping the PZT control signal smaller than 0.5*V1 (e.g. by step 722).

Preferably, either the position-indicative signal or one or both of the control signals is modified (e.g. by step 708) by attenuating a frequency component that corresponds to an actuator arm resonance, a flexure resonance, and a PZT resonance. For a simple implementation, it is also preferably that the voice coil control signal and the PZT control signal are each amplified by a respective semiconductor component (e.g. by the arrangement of FIG. 6). As used herein a "semiconductor component" is a contiguous piece of a semiconductor material (typically silicon) containing circuit elements, and optionally including a package containing the material.

It will be clear that the present invention is well adapted to attain the ends and advantages mentioned, as well as those inherent therein. While the presently preferred embodiments have been described for purposes of this disclosure, various changes and modifications may be made which are well within the scope of the present invention. For example, the present invention may be adapted for use in an optical disc drive, a tape drive, or any other data handling applications requiring fine positioning of a transducer. Thus numerous other changes, combinations, and arrangements of techniques may be made which will readily suggest themselves to those skilled in the art and which are encompassed in the spirit of the invention disclosed and as defined in the appended claims.

What is claimed is:

1. A method of positioning a read/write head in a data storage device having a voice coil suitable for coarse control and a piezoelectric transducer (PZT) suitable for fine control, the method comprising steps of:
    (a) receiving a position-indicative signal from the read/write head;
    (b) generating a voice coil control signal and a PZT control signal from the position-indicative signal;
    (c) powering the voice coil and the PZT via a first shared voltage source having a nominal DC voltage V1; and
    (d) applying the voice coil control signal to the voice coil and the PZT control signal to the PZT, each of the applied signals being amplified so that a first saturation voltage of each applied signal is smaller than |V1|.

2. The method of claim 1 in which the nominal DC voltage V1 supplied in the powering step (c) is +12 volts.

3. The method of claim 1 in which a 10 volt change in the PZT control signal can cause the read/write head to traverse several tracks on a data surface of the data storage device, and in which the applying step (d) includes a step (d1) of performing a seek by changing the PZT control signal without substantially changing the voice coil control signal.

4. The method of claim 1 in which the applying step (d) includes steps of:
    (d1) amplifying the PZT control signal;
    (d2) arithmetically combining the amplified signal of the amplifying step (d1) with a DC bias signal; and
    (d3) applying the combined signal of the combining step (d2) to the PZT.

5. The method of claim 1 in which the generating step (b) includes a step (b1) of attenuating a frequency component of the position-indicative signal that corresponds to a noise source selected from the group consisting of an actuator arm resonance, a flexure resonance, and a PZT resonance.

6. The method of claim 1 in which, during the applying step (d), the voice coil control signal and the PZT control signal are each amplified by a respective semiconductor component.

7. The method of claim 1 in which, during the applying step (d), the PZT control signal is amplified by a general purpose operational amplifier and the voice coil control signal is amplified by a semiconductor component that is physically separate from the general purpose operational amplifier.

8. The method of claim 1 in which the powering step (c) includes a step (c1) of powering the PZT and a preamplifier with a second shared voltage source having a nominal rectified voltage V2.

9. The method of claim 1 in which the applying step (d) includes a seek operation comprising a phase during which the voice coil control signal maintains a value within two volts of a positive saturation voltage.

10. The method of claim 1 in which the applying step (d) includes a seek operation comprising a phase during which the voice coil control signal maintains a value within two volts of a saturation voltage, and in which the PZT control signal maintains a value smaller than 0.5*|V1|.

11. The method of claim 1 in which the applying step (d) including a step (d1) of amplifying the PZT control signal with a general purpose operational amplifier.

12. The method of claim 1 in which the applying step (d) includes steps of:
    (d1) amplifying the PZT control signal with a general purpose operational amplifier;
    (d2) arithmetically combining the amplified signal of the amplifying step (d1) with a DC bias signal; and
    (d3) applying the combined signal of the combining step (d2) to the PZT.

13. A data handling device comprising:
    a data recording media surface having many data tracks;
    a read/write head supported by a flexure supported by an actuator arm;
    a dimensionally variable piezoelectric transducer (PZT) coupled to the actuator arm such that a dimensional change in the PZT causes the read/write head to be displaced across a portion of one of the tracks of the data recording media surface; and
    a general purpose operational amplifier electrically connected to a summing circuit electrically connected to the PZT, the general purpose operational amplifier powered by a first shared power source within the data storage device.

14. The apparatus of claim 13 wherein the general purpose operational amplifier is coupled to a filter circuit tuned to attenuate a high frequency disturbance dislocating the read/write head.

15. The apparatus of claim 13 wherein a first portion of the PZT is bonded to the actuator arm and a second portion of the PZT is bonded to the flexure.

16. The apparatus of claim 13 wherein a summing circuit output signal has an accompoment and a DC component and an amplitude generally bounded between −5V and +12V.

17. The apparatus of claim 13 wherein a DC bias voltage component corresponds to a voltage that dimensionally changes the PZT such that the PZT can radially displace the data transducer, relative to the data storage media, an equal distance toward or away from an inner diameter of the data storage media.

18. The apparatus of claim 13 wherein the general purpose operational amplifier has a maximum current output of 30 milliamps.

19. The apparatus of claim 13 wherein the general purpose operational amplifier has a maximum output voltage less than or equal to a maximum voltage output of a voltage supply used to power the general purpose operational amplifier.

20. The apparatus of claim 13 wherein the data handling device further comprises a first semiconductor component containing a servo driver circuit and a second semiconductor component containing the general purpose operational amplifier.

21. A method of using the apparatus of claim 13 comprising steps of:
   (a) receiving a position-indicative signal from the read/write head;
   (b) generating a voice coil control signal and a PZT control signal from the position-indicative signal;
   (c) powering the PZT and a voice coil indirectly coupled to the actuator arm via a first shared voltage source having a nominal DC voltage V1; and
   (d) applying the voice coil control signal to the voice coil and the PZT control signal to the PZT, each of the applied signals being amplified so that a first saturation voltage of each applied signal is smaller than |V1|.

22. The method of claim 21 in which a 10 volt change in the PZT control signal can cause the read/write head to traverse several tracks on a data surface of the data storage device, and in which the applying step (d) includes a step (d1) of performing a seek by changing the PZT control signal without substantially changing the voice coil control signal.

23. The method of claim 21 in which the applying step (d) includes steps of:
   (d1) amplifying the PZT control signal with a general purpose operational amplifier;
   (d2) arithmetically combining the amplified signal of the amplifying step (d1) with a DC bias signal; and
   (d3) applying the combined signal of the combining step (d2) to the PZT.

24. The method of claim 21 in which the applying step (d) includes steps of:
   (d1) amplifying the PZT control signal;
   (d2) arithmetically combining the amplified signal of the amplifying step (d1) with a DC bias signal; and
   (d3) applying the combined signal of the combining step (d2) to the PZT.

25. A system for positioning a transducer relative to tracks on a disc in a data storage device, comprising:
   an actuator assembly including a voice coil motor (VCM), an actuator arm, a read/write head supported by the actuator arm, and a microactuator coupled to the actuator arm;
   a first power supply having a nominal voltage V1;
   a second power supply having a nominal voltage V2, wherein the absolute value of V2 is less than the absolute value of V1; and
   a microactuator driver providing a microactuator driving signal to the microactuator, the microactuator driver being electrically connected to both the first power supply and the second power supply.

26. A system as defined in claim 25, wherein the microactuator comprises a dimensionally variable piezoelectric transducer (PZT).

27. A system as defined in claim 25, wherein V1 is approximately 12 volts and V2 is approximately −5 volts.

28. A system as defined in claim 25, wherein the microactuator driving signal is biased at a voltage approximately midway between V1 and V2.

29. A system as defined in claim 25, further comprising a VCM driver providing a VCM driving signal to the VCM, the VCM driver being electrically connected to the first power supply.

30. A system as defined in claim 25, further comprising a read/write head driver circuit electrically connected to the read/write and the second power supply.

* * * * *